Figure 1:
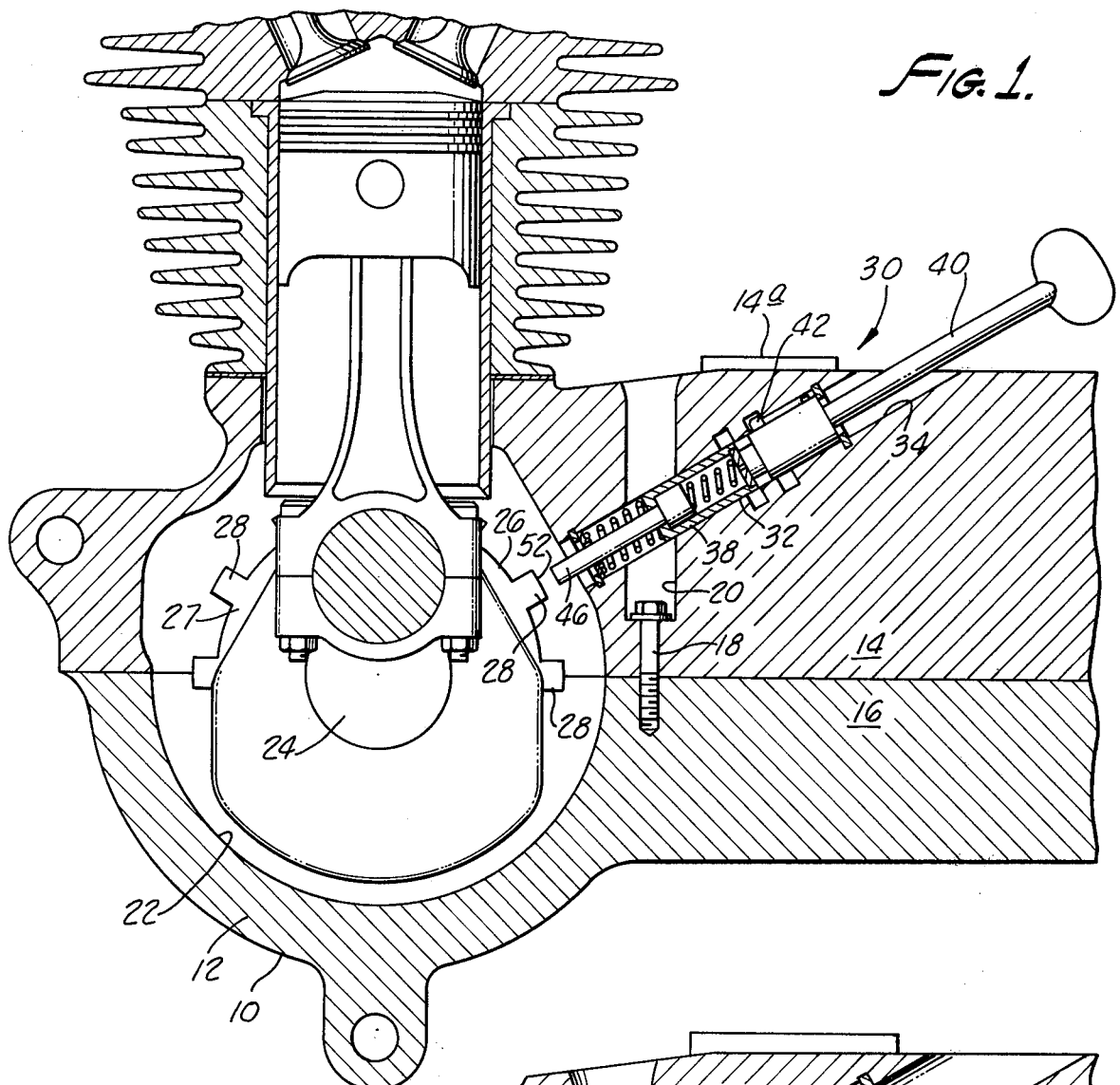

United States Patent [19]

Row

[11] 4,329,953
[45] May 18, 1982

[54] MOTORCYCLE ANTITHEFT SYSTEM

[75] Inventor: Jon D. Row, Huntington Beach, Calif.

[73] Assignee: American Honda Motor Co., Inc., Gardena, Calif.

[21] Appl. No.: 182,495

[22] Filed: Aug. 29, 1980

[51] Int. Cl.³ .............................................. B62H 5/08
[52] U.S. Cl. ................................... 123/198 B; 70/236; 70/245; 70/186; 70/DIG. 57; 180/287
[58] Field of Search ...................... 123/198 B, 198 R; 70/233, 236, 237, 245, 246, 247, 249, 186, 185, 190, DIG. 57; 180/287, 219

[56] References Cited

U.S. PATENT DOCUMENTS

| | | | |
|---|---|---|---|
| 1,290,752 | 1/1919 | Jensen | 70/DIG. 57 |
| 1,323,166 | 11/1919 | Dencheff | 123/198 B |
| 1,360,338 | 11/1920 | Werdhoff | 70/245 |
| 1,394,357 | 10/1921 | Rose | 70/245 |
| 1,526,207 | 2/1925 | Dumas | 70/245 |
| 1,530,801 | 3/1925 | Akin | 70/245 |
| 1,542,137 | 6/1925 | Hoffmann | 70/246 |
| 1,564,220 | 12/1925 | Dumas | 70/247 |
| 1,613,698 | 1/1927 | Flint et al. | 70/245 |

FOREIGN PATENT DOCUMENTS

| | | | |
|---|---|---|---|
| 964134 | 8/1950 | France | 70/185 |
| 726389 | 3/1955 | United Kingdom | 70/245 |
| 741513 | 12/1955 | United Kingdom | 70/245 |

Primary Examiner—Ira S. Lazarus
Attorney, Agent, or Firm—Lyon & Lyon

[57] ABSTRACT

A motorcycle antitheft system in which the motorcycle engine is rendered inoperable by mechanical restraint of the crankshaft. The crankshaft is housed in a crankcase which has two sections held together by bolts positioned in recesses in one of the sections. The antitheft system comprises a bore formed in the crankcase, a lock assembly mounted in the bore for axial movement therein between a locked position and an unlocked position, a rigid plunger secured to one end of the lock assembly extending toward the crankshaft and a toothed crankwheel mounted on the crankshaft. When the lock assembly is in the locked position, it passes through one of the bolt recesses in the crankcase, thereby blocking access to the bolt and preventing opening of the crankcase. Movement of the assembly to the locked position also extends the plunger into a space between teeth on the crankwheel to thereby prevent rotation of the crankwheel and crankshaft.

4 Claims, 2 Drawing Figures

MOTORCYCLE ANTITHEFT SYSTEM

BACKGROUND OF THE INVENTION

The present high rate of motorcycle theft has several adverse effects on the motorcycle industry and the public. Potential riders may be discouraged from purchasing a motorcycle by the risk of having it stolen. Insurance rates for motorcycles have increased to reflect the high rate of theft. Finally, research shows that stolen motorcycles are involved in an abnormally high percentage of accidents and fatalities.

One solution has been to carry security attachments, such as chains, cables and interlocking bars, on the motorcycle which can be used to secure the vehicle to an immovable object, such as a pole or a tree. The effectiveness of these devices varies with their size and weight. Smaller attachments often can be broken using a blowtorch, hacksaw or similar tool. Larger attachments are inconvenient and difficult to store on the bike, and can even be dangerous as a result of coming loose during riding.

Another solution has been to attach an alarm device to the motorcycle. The alarm is set when the vehicle is parked, and goes off if the motorcycle is subsequently moved. One drawback to these alarms is that they may be activated accidentally. Another drawback is that they can easily be silenced by a blast of carbon dioxide or even shaving cream.

Other solutions include fork locks, ignition switches and fuse blocks. These devices often only temporarily detain the thief who can bypass, disable or dismantle them on the spot. Also, motorcycles can usually be physically lifted into a van or a truck and removed. The thief can then dismantle any antitheft device that may be in use. If motorcycle parts are broken in the process, the thief can easily and inexpensively obtain new parts from a dealer or from other stolen motorcycles.

It is an object of the present invention, therefore, to provide an improved motorcycle antitheft system which overcomes the problems in the art and has a deterrent effect on potential motorcycles thieves.

In particular, it is an object of this invention to provide a system wherein operation of the motorcycle is impossible when the system is activated and destruction or disablement of the system is impossible without damaging parts which cannot be replaced without simultaneous proof of ownership.

It is a further object of this invention to provide an antitheft system which is inherently difficult to disable or dismantle.

It is a still further object of this invention to provide an antitheft system which prevents opening of the crankcase.

SUMMARY OF THE INVENTION

The present invention provides an improved antitheft system adapted for use on a motorcycle crankcase. A bore is provided in the crankcase body and extends at an angle from the top of the crankcase to an interior cavity where the crankshaft is located. A lock assembly having a rigid plunger secured to one end thereof is mounted in the bore for movement therein between a locked position and an unlocked position. The crankshaft is provided with a restraining member, such as a toothed crankwheel mounted on the shaft, which is operable to engage the plunger and prevent the shaft from turning. When the lock assembly is in the locked position, the plunger is extended into engagement with the restraining member. When the assembly is in the unlocked position, the plunger is retracted and the crankshaft is free to rotate. The lock assembly can only be moved when a complementary key is inserted therein.

The crankcase has a two-piece body which is held together by bolts provided in recesses in one of the pieces. In the present invention, the lock assembly passes through one of the bolt recesses at an angle and thereby blocks access to the bolt. In order to disable the antitheft system, a thief must open the crankcase. However, since one of the bolts is obstructed, the thief cannot open the crankcase without doing deliberate damage to it.

The antitheft system of this invention is incorporated into a broad scheme wherein the crankcase parts are stamped with identification numbers and parts suppliers are prevented from dispensing replacement crankcase parts except upon return of the old part and proof of ownership thereof. Thus, even if a thief succeeds in disabling the antitheft device by damaging the crankcase, he cannot obtain replacement parts. In this manner, the antitheft system of this invention operates effectively to deter would-be thieves from attempting to steal motorcycles.

The invention thus provides an inexpensive, convenient and effective antitheft system for motorcycles. It provides a system which is inherently difficult to disable or destroy. The invention also provides a motorcycle antitheft scheme which incorporates the improved system and operates to reduce motorcycle crime.

Figure 2:
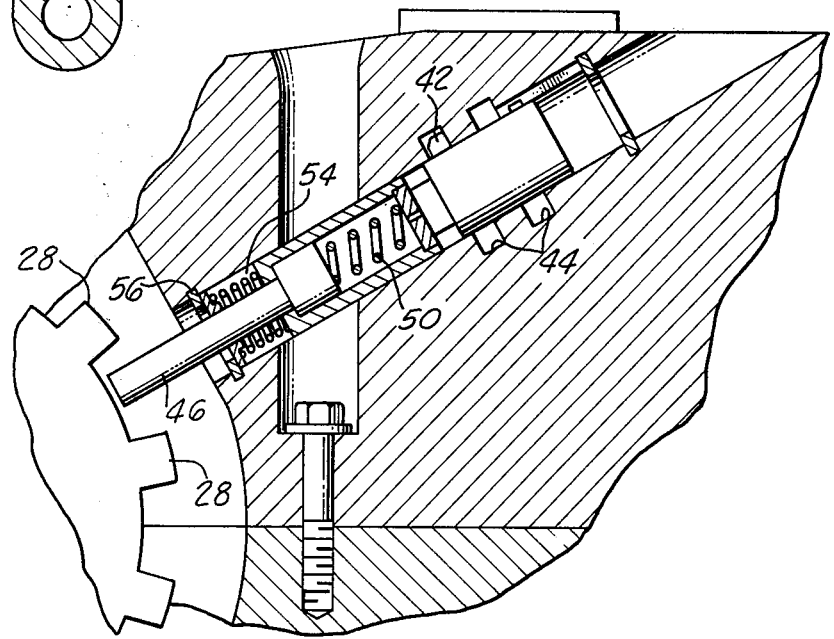

Further objects, features and advantages of this invention will become apparent from a consideration of the following description, the appended claims and the accompanying drawing in which:

FIG. 1 is a sectional view of the motorcycle antitheft system of this invention, showing the lock assembly thereof in the unlocked position; and FIG. 2 is an enlarged sectional view showing the lock assembly in the locked position.

DESCRIPTION OF THE INVENTION

With reference to FIG. 1, a motorcycle crankcase 10 is indicated as having a body 12 which is divided between an upper section 14 and a lower section 16. The sections 14 and 16 are secured together by means of one or more bolts 18, there being shown in the drawing only one of said bolts. The bolt 18 is positioned in a recess 20 in the crankcase upper section 14 and extends downwardly into the lower section 16. The crankcase body 12 forms a cavity 22 in which a crankshaft 24 and other parts of the motorcycle engine are located.

The antitheft system of this invention, indicated generally at 30 in the drawing, includes a lock assembly 32 positioned in a bore 34 formed in the crankcase body 12. The bore 34 is preferably formed in the upper section 14 and extends at an angle from the top surface thereof to the cavity 22. Bores 34 can be provided on new crankcases during the molding process or can be machined into existing crankcases. As seen in the drawing, the bore 34 intersects the bolt recess 20 for a purpose to appear presently.

The lock assembly 32 comprises a cylinder lock 36 to one end of which a frame member 38 is secured. The lock 36 carries a tumbler (not shown) which rotates about the axis of the bore in response to the turning of a complementary key 40. Depending upon the direction in which the key 40 is turned, the tumbler 36 operates to extend or retract an actuator bolt 42. When the actuator bolt 42 is retracted, the lock assembly 32 is capable of axial displacement within the bore 34 between an "unlocked" position and a "locked" position. A pair of circumferential grooves 44 determine the locked and unlocked positions; when the actuator bolt is extended into the groove 44 nearest the top surface of the crankcase (FIG. 1), the assembly 32 is maintained in the unlocked position and when the bolt 42 is extended into the groove 44 nearest the cavity 22 (FIG. 2), the assembly 32 is maintained in the locked position. The bolt 42 is spring loaded and seeks the extended position so as to facilitate location of the assembly 32 in its locked and unlocked positions.

The frame 38 carries a rigid plunger 46 which extends toward the cavity 22. The plunger 46 is preferably produced from a hardened or reinforced metal such as steel. The crankshaft 24 is provided with a restraining member 26 which is operable to engage the plunger 46 to prevent the crankshaft 24 from turning. In the illustrated embodiment, the restraining member 26 comprises a toothed crankwheel 27 secured to the crankshaft 24. In the alternative, the restraining member may comprise a notch or hole formed directly into the crankshaft 24 or an attachment suitable for performing the same function as the crankwheel 27.

The significance of the terms "locked" and "unlocked" will now be explained. When the lock assembly 32 is unlocked, the plunger 46 remains free from contact with the crankwheel 26. However, when the assembly 32 is locked, that is, when it is moved downwardly into a position where the lowermost groove 44 receives the actuator bolt 42 (FIG. 2), the plunger 46 extends into engagement with the restraining member 26. In the illustrated embodiment, the plunger 46 extends into a space between teeth 28 on the crankwheel 27. Thus, the crankshaft 24 is prevented from turning and the engine cannot be started. In addition, when the system 30 is in the locked position the lock assembly 32 passes through the crankcase bolt recess 20 and blocks access to the bolt 18. Thus, the crankcase cannot be opened without causing it severe damage.

A coil spring 50 is provided on the frame 38 and engages one end of the plunger 46 to thereby make the plunger 46 movable relative to the frame 38 along the axis of the bore 34. Thus, if the assembly 32 is locked and the plunger 46 abuts the outermost edge 52 of one of the crankwheel teeth 28, the spring 50 is compressed. Any subsequent rotation of the crankwheel 27 causes the plunger 46 to snap into place between the teeth 28.

The antitheft system of this invention operates as follows. While the motorcycle is running, the lock assembly 32 is maintained in the unlocked position, as seen in FIG. 1. When the motorcycle is parked, the owner simply turns the key 40 in the clockwise direction, so that the actuator bolt 42 is retracted. He then pushes the key 40, and thus the entire lock assembly 32, downwardly in the bore 34. The key 40 is then turned in the counterclockwise direction so that the actuator bolt 42 extends into the lower groove 44. This is all that is required to fix the plunger 46 between the teeth of the crankwheel.

When the lock assembly 32 is locked, the engine cannot be started. In order to restore the motorcycle to running condition, a would-be thief must gain access to the crankcase internal cavity 22, break the lock assembly 32 or pick the lock 36. As seen in the drawing, the lock assembly 32 is recessed in the bore 34 in order to dampen efforts to pick the lock 36. The lock assembly 32 passes through the recess 20 at an acute angle so that drilling of the assembly 32 blocks access to the bolt 18. Thus, it is nearly impossible for a thief to restore the vehicle to running condition without doing deliberate and severe damage to the crankcase body 12.

The antitheft system 30 of this invention is incorporated into a broad antitheft scheme. Crankcase parts are stamped with the manufacturer's identification numbers on the crankcase stamping block 14a, and the manufacturer will not supply replacement crankcase parts unless the old parts are returned and proof of their ownership is established. The system 30 and the overall scheme thus present several obstacles to would-be motorcycle thieves. The thief must damage crankcase parts in order to bypass the antitheft system 30 and is subsequently prevented from obtaining replacement parts. The result is a general deterrence from motorcycle theft attempts.

To unlock the system 30, the key 40 is reinserted into the lock 36 and turned in the counterclockwise direction, retracting the bolt 42. Spring means 54 provided on a clip 56 positioned at the lower end of the bore 34 operate to force the lock assembly toward the unlocked position. The key 40 is turned in the clockwise direction and the bolt 42 extends into the groove 44 to maintain the system 30 in the unlocked position.

The invention thus provides an improved antitheft system 30 adapted for use in a motorcycle crankcase. The system 30 contains a plunger 46 which mechanically prevents rotation of the motorcycle crankshaft. A lock assembly 32 is provided to position the plunger 46 and to block access to the opening mechanism of the crankcase. The system 30 is incorporated into an improved antitheft scheme wherein crankcase parts are stamped with identification numbers and replacement parts cannot be obtained without proof of ownership. The invention constitutes an improved method of reducing motorcycle thefts.

Having fully described my invention, it is to be understood that I am not to be limited to the details herein set forth but that my invention is of the full scope of the appended claims.

I claim:

1. In a motorcycle having a crankshaft positioned in a crankcase wherein said crankcase comprises a body having at least two parts and closing means accessible from one direction operable to hold said parts together, a motorcycle antitheft system comprising a bore formed in said crankcase body extending toward said crankshaft through the line of access to said closing means, a plunger movable along the axis of said bore between an unlocked position and a locked position wherein access to said closing means is blocked, locking means operable to alternately maintain said plunger in either said locked or said unlocked position and means on said crankshaft operable to engage said plunger in said locked position to thereby prevent rotation of said crankshaft.

2. In a motorcycle having a crankcase which comprises a body having at least two parts forming a cavity wherein a crankshaft is located and a plurality of connecting bolts positioned in recesses formed in said body to hold said parts together, a motorcycle antitheft system operable to prevent rotation of said crankshaft and preclude disassembly of said crankcase body comprising a bore formed in said body extending from a surface thereof to said cavity, said bore intersecting at an angle at least one of said recesses, a lock assembly recessed in said bore and movable in response to movement of a complementary key member along the axis of said bore between a locked position and an unlocked position, a rigid plunger secured to one end of said lock assembly extending toward said cavity and a crankwheel secured to said crankshaft having at least one recess formed therein operable to receive said plunger so that when said lock assembly is in said unlocked position said crankshaft rotates without interference with said plunger and when said lock assembly is in said locked position said plunger engages said crankwheel and said lock assembly obstructs access to one of said bolts.

3. The motorcycle antitheft system according to claim 2 wherein said crankwheel comprises a toothed wheel.

4. The motorcycle antitheft system according to claim 2 wherein said plunger is movable relative to said lock assembly along the axis of said bore and further including spring means secured to said lock assembly to urge said plunger axially toward said crankshaft.

* * * * *